Aug. 30, 1966                C. H. HELBING                3,269,816
METHOD FOR PRODUCING GLASS FIBERS
Filed Aug. 31, 1964                              3 Sheets-Sheet 1
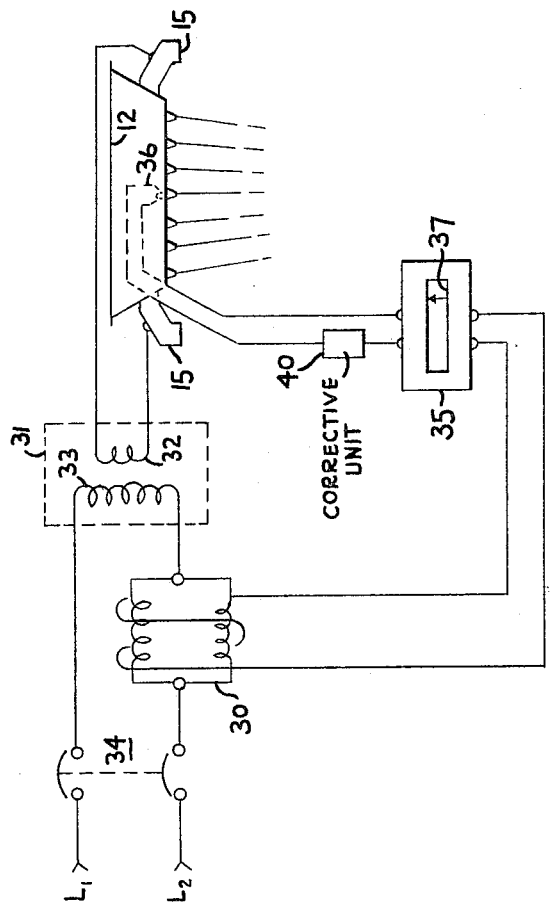
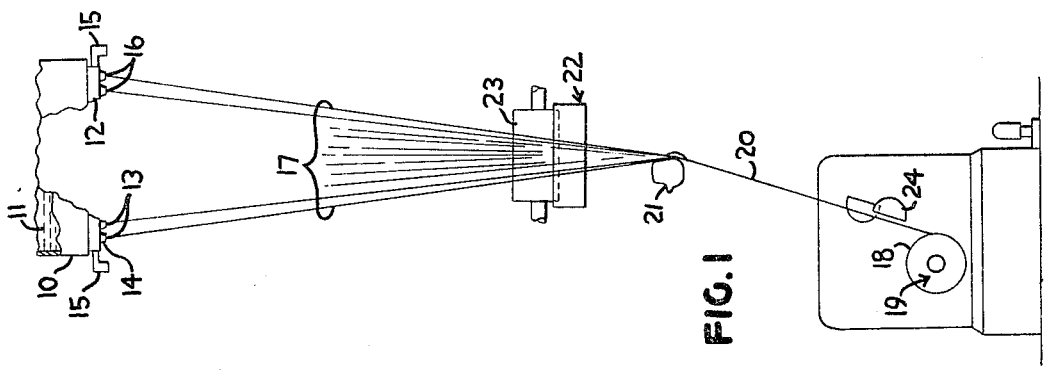
INVENTOR.
CLARENCE H. HELBING
BY Chisholm and Spencer
ATTORNEYS United States Patent Office 3,269,816
Patented August 30, 1966

3,269,816
METHOD FOR PRODUCING GLASS FIBERS
Clarence H. Helbing, Shelbyville, Ind., assignor to Pittsburgh Plate Glass Company, Pittsburgh, Pa., a corporation of Pennsylvania
Filed Aug. 31, 1964, Ser. No. 393,265
4 Claims. (Cl. 65—2)

This application is a continuation-in-part of my copending application, Serial No. 154,526, filed November 24, 1961, now abandoned, entitled, "Method and Apparatus for Producing Glass Fibers."

This invention relates to the formation of glass fibers and in particular to a method of adjusting the temperature of the fiber glass bushing throughout a complete operating cycle. The invention is particularly applicable in the process of producing continuous fibers which are wound on packages as they are drawn from a bushing.

The present invention has particular application in the production of the coarser fibers, i.e., those larger than 5 microns in diameter, and in the production of more than one strand from a single fiber-forming station wherein a greater number of molten glass-extruding tips are located in an area than was formerly the case.

In the above, it has become very difficult to handle the glass as is required every time a new winding cycle is started. When coarse fibers are drawn a greater mass of molten glass is concentrated in a given area than would be the case with a fine fiber. This condition also exists where a plurality of strands are being produced at a single forming station as when a split bushing is used and the fibers from each bushing part are gathered into a strand, which strands are subsequently combined and wound onto a package. Here, nearly twice the quantity of molten glass is processed as compared to a similar area where a single strand is formed.

This invention also finds use in a "single-level" process, i.e., wherein the bushing, size applicator, traverse and winding apparatus are located on a single floor instead of being divided between two floors as in some previous continuous fiber producing installations. In this single level process the operator is much closer to the bushing tips—a mere matter of inches—than he is in the more conventional double level process, wherein the bushing is on one level and the operator on another level, i.e., on the order of six or seven feet apart.

In the above-described processes and with particular reference to the production of the relatively large diameter fibers, it can be readily understood that the glass within the bushing must be maintained relatively fluid to draw such fibers. Between actual winding times, the fluid glass merely flows from the bushings and this is wasteful as well as dangerous to the operator because of his proximity to the bushing.

The waste of glass and the dangerous condition can be readily overcome by using the present invention. Also, as a package onto which the strand or strands are wound increases in diameter, the rate of draw is ever increasing. This results in a more highly attenuated fiber. Thus, a diameter variation is introduced into the fiber, a condition which is undesirable.

In accordance with the present invention, as the fiber glass package is wound, the bushing temperature is constantly increased from a predetermined starting temperature to effect a yardage constancy, compensating for the increasing attenuating forces resulting from the buildup of the package diameter which is being driven at a constant r.p.m. When the winding operation is stopped to remove the finished package and start a new one, and if for any other reason the winding operation is stopped, the temperature of the bushing is decreased below the initial starting temperature by a finite amount. Upon restart of the winding operation, the temperature of the bushing is quickly brought back up to its starting temperature and thereafter increases to compensate for variations in attenuating force.

By materially reducing the temperature of the bushing during the nonwinding periods, the temperature of the glass in the bushing is noticeably reduced. The glass flowing from the bushing can be handled by the operator for starting the next winding cycle without danger to him. The reduced bushing temperature also makes the molten glass more viscous and thus prevents the dropping of hot glass which may occur when the glass is in a highly fluid state.

The present invention may be better understood with reference to the drawings wherein:

FIGURE 1 is a diagrammatic elevation of a fiber forming apparatus;

FIGURE 2 is a diagrammatic view of a means for controlling the bushing temperature;

Figure 3:
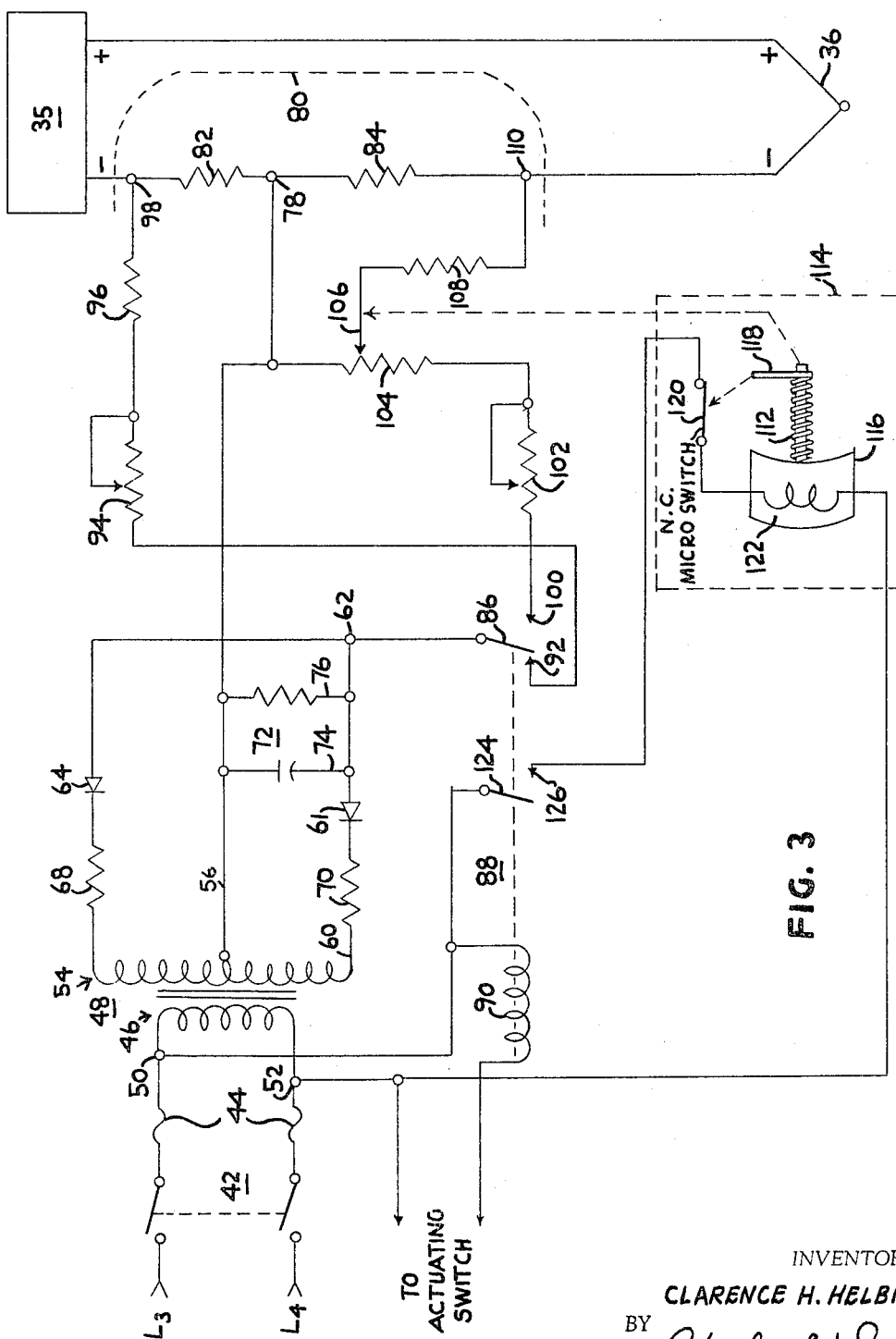
FIGURE 3 is a diagrammatic view in greater detail of the corrective circuit portion of FIGURE 2.

In FIGURE 1, there is shown a glass melting container 10 or forehearth thereof containing a supply of molten glass 11 and having an electrically heated feeder or bushing 12 attached to the bottom of the container. The bushing 12 is trough-like in shape and provided with a series of orifices 13, which orifices are defined by tips 14 suspended from the bottom portion of the bushing. The bushing is composed of an alloy containing about 90 percent platinum and 10 percent rhodium and is heated by passing through it electric current from a suitable source. The current is received by the bushing from the source by means of terminals or lugs 15 attached to opposite ends of the bushing along the vertical end walls of the bushing.

The molten glass 11 within the bushing is maintained at a temperature suitable for fiberizing by means of heat transferred by conduction from the bushing to the glass contained therein. The molten glass flows through the tips 14 and forms in small cones 16 suspended from the tips. The tips are lined in four or more rows having a great many tips in each row, so that the total number of tips may be 100 or more. A smaller or greater number of rows and/or tips may be present in the bushing.

Glass filaments or fibers 17 are pulled from the cones 16 at a very high rate of speed; for example, 5,000 to 20,000 feet per minute, usually about 10,000 feet per minute, and wound on a rapidly rotating forming tube 18 mounted on a rotating collet 19. The collet may be approximately 6 to 8 inches in outside diameter and may rotate at approximately 6,000 to 8,000 r.p.m., depending upon the size of the fiber to be produced and other operating conditions, such as temperature of the glass in the cones 16. The glass fibers are grouped into a strand 20 as they pass over a fiber gathering guide 21 prior to being wound on the forming tube 18.

Usually, an aqueous size containing a liquid binder and a lubricant, such as a combination of starch and a vegetable oil or a silane or chrome base binder, is applied to the individual fibers 17 of the strand 20 as they pass over a size applicator 22 which is mounted just above the guide 21. The size transfer surface in the applicator 22 may be in the form of a rotating roller 23 or a moving belt having a film of the size applied to it. The fibers 17 pass over the roller or belt at some tangential point for momentary contact with the sizing solution to transfer the solution from the applicator to the fibers.

As the strand 20 is wound on the tube, it is given a traversing motion by means of traversing mechanism 24. The strand is distributed along the length of the forming tube by the throw of the traversing mechanism or perhaps, in addition to the throw, by relative motion between the forming tube 18 and the traversing mechanism 24 created by slowly reciprocating the forming tube and traversing mechanism continuously in opposite directions during the fiber forming run.

FIGURES 2 and 3 show the means for increasing the bushing temperature with the formation of package buildup and subsequently decreasing the bushing temperature to below the startup temperature of the bushing when the collet motor is stopped, all in accordance with our invention. FIGURE 2 shows an electrical power circuit containing suitable controls for supplying energy to the bushing 12, the controls comprising the apparatus of applicant's invention. The power circuit includes a saturable core reactor 30 in series with a power transformer 31 for the bushing 12. The bushing terminals 15 connect the bushing 12 in series with the secondary winding 32 of the transformer 31. The primary winding 33 of the transformer 31 is connected in series with the saturable core reactor 30 and the series circuit is connected through contacts 34 of a line circuit breaker to a suitable power line source L1 and L2, such for example, as a 440-volt, 60-cycle line.

The temperature regulating controls for the power circuit may be provided by a conventional temperature measuring and regulating unit 35 which is arranged to operate in conjunction with a thermocouple 36 which is in thermal contact with the bushing 12. The unit 35 measures the temperature of the bushing 12 by means of the thermocouple 36 and indicates the temperature signal at a meter 37 provided with means for presetting the temperature desired. As the temperature signal fed to the unit 35 varies from a pre-set value, the unit 35 supplies a corrected signal to the power circuit by way of the saturable reactor to establish the heating current flow to the bushing for the temperature desired.

The unit 35 receives, in addition to the signal from the thermocouple 36, an auxiliary signal from a "corrective circuit" 40 which, in effect, causes a false signal to be supplied to the temperature regulating unit 35. The increase or the decrease in temperature of the bushing is accomplished by supplying a false temperature signal to the temperature regulating unit 35 from the corrective circuit 40 along with the actual temperature signal supplied by the thermocouple 36. The corrective circuit 40 is connected to the regulating unit 35 in series with the thermocouple 36 and is so arranged that an increase in the signal from the unit 40 causes a decrease in the total signal, so as to indicate falsely to the temperature regulating unit 35 that the temperature of the bushing 12 is falling, and on the other hand, it is so arranged that a decrease in the signal from the unit 40 causes an increase in the total signal, so as to indicate falsely to the temperature regulating unit 35 that the temperature of the bushing 12 is increasing. The temperature regulator unit 35 then sends an increased or a decreased current signal, depending on the above conditions, to the saturable core reactor which either reduces or increases the inductive reactance of the reactor and thereby permits more or less current to be supplied to the transformer 31 and consequently more or less to the bushing 12.

The corrective circuit 40 is shown in FIGURE 3 in more detail in combination with the temperature regulating unit 35, thermocouple 36 and bushing 12. The power supply for the corrective circuit is a rectified A.C. source. An alternating current source (not shown), such as a 110-volt A.C., 60-cycle supply, is connected through lines L3 and L4, a double pole on-off switch 42, and line fuses 44 to the primary 46 of the transformer 48 at primary extremities 50 and 52. The secondary 54 of transformer 48 has a center tap connection 56 in addition to end terminals 58 and 60. The output of the transformer secondary is full wave rectified by connecting the terminals 58 and 60 together at point 62 through rectifiers 64 and 66, respectively. Point 62 serves as the negative terminal, while center tap 56 is the positive terminal. Current limiting resistors 68 and 70 are included in the circuit of the secondary 54. An R-C filter 72 comprising the elements 74 and 76 is included in the output of the D.-C. source. The positive terminal, transformer center tap 56, is connected directly to the center tap 78 of a center-tapped voltage divider 80 which has an upper portion 84. Voltage divider 80 is in series with the thermocouple 36 and the temperature regulating unit 35.

The negative terminal 62 is connected to the movable contact arm 86 of relay 88. Depending upon the state of energization of coil 90 of relay 88, the negative terminal is connected to one of two circuits. With the arm 86 as shown in FIGURE 3, the negative terminal is connected through contact 92, in series with variable resistor 94 and resistor 96 to end 98 of voltage divider 80. In its alternative position, arm 86 connects the negative terminal through contact 100, variable resistor 102, potentiometer 104, potentiometer arm 106, and resistor 108, to end 110 of voltage divider 80.

The potentiometer arm 106 is directly driven by the rotating shaft 112 of a timer 114. The shaft 112 is driven by a synchronous motor 116 through gear reduction equipment (not shown). Mounted on the shaft 112 is an extending arm 118 which rotates therewith. A normally closed microswitch 120 is electrically in series with field winding 122 of motor 116 and in close physical proximity to arm 118. Arm 118 is disposed to open microswitch 120 after a predetermined angular rotation.

An actuating switch (not shown) is in circuit relation with the A.C. supply across points 46 and 52 and coil 90 of relay 88. The actuating switch is of such a type that start-up of the collet motor closes the actuating switch. One actuating switch that could perform the function would be a centrifugal switch mounted on the rotor shaft of the collet motor. Another could be a simple relay type switch, the exciting coil of which is in series with the field winding of the collet motor, and of course, a simple manual switch could be employed. The actuating switch as aforementioned is in series with the coil 90 of the double armed relay 88. Contact arms 86 and 124 are both affected by the energization level of coil 90, so that, in their normal de-energized position as shown in FIGURE 3, both arms are thrown to the left with arm 86 engaging contact 54 and arm 124 not engaged. When the coil 90 is energized, arms 86 and 124 are both thrown to the right, arm 86 engaging contact 100 and arm 124 engaging contact 126.

In operation, closure of the actuating switch excites relay coil 90. Excitation of coil 90 throws the relay arms 86 and 124 to the right, arm 86 to engage contact 100 and arm 124 to engage contact 126. Arm 124 and contact 126 close a circuit including the A.C. supply, the normally closed microswitch 120 and the field winding 122 of synchronous motor 116. The motor therefore is quickly brought up to speed and drives shaft 112 at a predetermined r.p.m. (on the order of $\frac{1}{30}$ r.p.m.) through proper gear reduction equipment.

Arm 86 and contact 100 close a two-loop circuit, one circuit containing the D.C. supply terminals 56 and 62, variable resistor 102, and potentiometer 104. The second loop contains the D.C. supply, variable resistor 102, a portion of potentiometer 104 through arm 106, resistor 108 and portion 84 of voltage divider 80.

Under these initial conditions, the potentiometer arm 106 is in its uppermost position as viewed in FIGURE 3, virtually short circuiting portions 84 of voltage divider 80. Therefore, unit 35 receives only the signal from the thermocouple 36.

As the potentiometer arm 106 is slid along the resistance coils of potentiometer 104 by motor shaft 112, a finite voltage is impressed across portion 84 of voltage divider 80. The polarity of this voltage is opposed to the voltage generated by the thermocouple unit so that the total signal which the temperature control unit 35 sees is less than the voltage the instant before, indicating falsely that the temperature of the bushing is falling. Unit 35 then sends an increased current signal to the saturable core reactor 30 which reduces the inductive reactance of the reactor and permits more current to be supplied to the transformer 37 of FIGURE 2 and consequently, more current to the bushing 12.

As the timed cycle progresses, an ever increasing voltage is impressed across portion 84 of the voltage divider 80, resulting ultimately in an ever increasing bushing temperature. The setting of variable resistor 102 determines the slope of or rate of increase of the voltage impressed across portion 84, and thus the rate of increase of the bushing temperature, as represented in the slope of line 200 of FIGURE 4. The value of resistor 108 determines the absolute value of voltage range in which the corrective circuit will operate.

Upon completion of the fiber glass package wind, the collet motor is stopped, and, also if for any other reason the collet motor is stopped, the actuating switch is opened thereby de-energizing relay coil 90. This action separates arm 124 from contact 126 opening the motor circuit, thereby stopping the motor 116. The spring loaded shaft 112 immediately returns the potentiometer arm 106 to its initial position. De-energization of the relay coil 90 also removes the D.C. voltage supply lines from the temperature compensating circuits and, instead, impresses the D.C. supply upon the upper portion 82 of voltage divider 80 through variable resistor 94 and resistor 96.

In so doing, a D.C. voltage is placed in series with the voltage developed by the thermocouple 36 and, as can best be seen in FIGURE 3, this voltage is an adding relation with the thermocouple voltage. The effect of this added voltage is to increase the total signal transmitted to the regulating unit 35, indicating falsely that the temperature of the bushing has increased. The regulating unit 35 then sends a decreased signal to the saturable core reactor 30 which increases the inductive reactance of the reactor 30 and permits less current to be supplied to the transformer 31 and consequently less current to the bushing, thereby reducing the bushing temperature. Selection of the ohmic value of resistor 94 determines precisely how much the temperature of the bushing will be dropped. Its ohmic value is selected so that the bushing temperature is noticeably less than the startup bushing temperature, thereby facilitating the handling of the cooler glass fibers and reducing waste normally occurring during periods of "no-run."

If the collet motor is not stopped in a predetermined time interval, thereby opening the actuating switch, the arm 118 on shaft 112 has rotated a sufficient number of degrees to engage and open the normally closed microswitch 120. The arm 118 may be set on the shaft to give a predetermined operating cycle; for example, if the shaft is rotated at 1/30 r.p.m. and a 16-minute operating cycle is desired, the arm 118 is set to engage and open the switch after it rotates 196 degrees. Opening the switch will stop the motor 116 and the spring loaded shaft 112 will run the potentiometer arm 106 back to its initial position.

Figure 4:
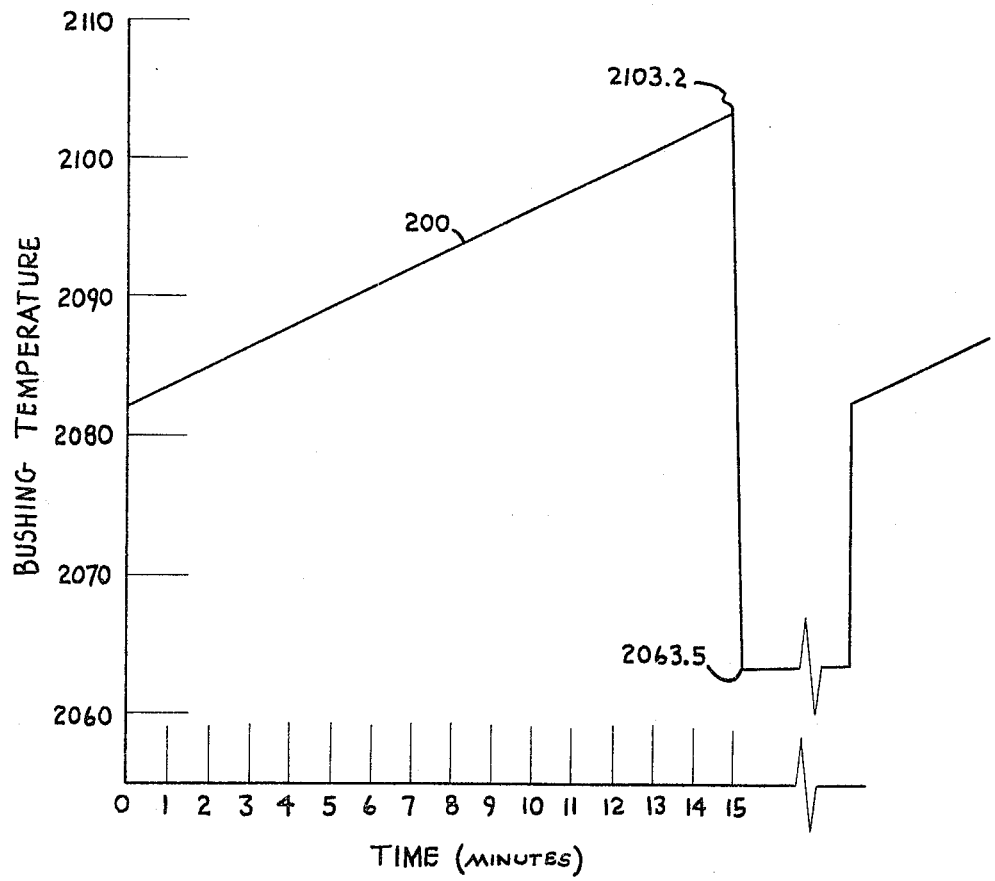
FIGURE 4 is a curve of temperature vs. time representing the conditions in the bushing controlled in accordance with the present invention.

By way of an example, a 15-minute winding cycle was run employing the apparatus of the present invention, the results of which are represented graphically in FIGURE 4. The starting bushing temperature was 2082.5° F. and was increased linearly to 2103.2° F. by the end of the cycle along line 200 or an increase of 20.7° F. This increase in temperature compensated for any potential yardage variation due to the increased attenuating forces caused by the increasing package diameter. When the winding operation was stopped, the temperature of the bushing was reduced to 19° F. below the starting temperature, or 2063.9° F., in less than a minute. This rapid reduction in temperature prevented glass from dropping and also made the glass much easier to handle in the subsequent restart. It has been found that the best temperature reducing differential is in the range of 10 to 30° F. below the initial desired startup bushing temperature. The critical element in the circuit of FIGURE 3 in determining the temperature reducing differential is the variable resistor 94. Before the next startup, the bushing temperature was raised to its initial temperature in less than a minute.

In the circuit disclosed in FIGURE 3 the following component values were used:

| | |
|---|---|
| Voltage divider 80 | 1.254 ohms. |
| Variable resistor 94 | 1 megohm. |
| Resistor 96 | 240K ohms. |
| Variable resistor 102 | 2.5K ohms. |
| Helipot 104 | 1K ohm. |
| Variable resistor 108 | 91K ohms, or 56K ohms, or 22K ohms. |

It must be kept in mind, however, that any of the above values may be varied to fit a particular need.

Although the present invention has been described with respect to specific details of a certain embodiment thereof, such details are not to be considered as limitations upon the scope of the invention except insofar as set forth in the accompanying claims.

I claims:
1. In a method of producing glass fibers characterized by extruding molten glass from a heated bushing having a predetermined startup temperature at which temperature the glass extruding from the bushing is suitable for fiberizing, collecting said fibers on a winding package of ever increasing diameter, said winding package being adapted to wind for only a finite period of time, the improvement comprising, increasing the temperature of said bushing from its startup temperature throughout the winding operation, sensing a stop in the winding operation, and in response thereto, rapidly reducing the temperature of the bushing 10° F. to 30° F. below the startup temperature at which temperature the viscosity of the glass at the bushing is greater than that at which the glass is capable of being fiberized.

2. The method of claim 1 wherein the temperature of the bushing is reduced to below the startup temperature in less than a minute.

3. The method of claim 1 including the steps of sensing restart of the winding operation, and in response thereto, rapidly increasing the temperature of the bushing to its startup temperature.

4. The method of claim 3 wherein the temperature of the bushing is increased to its startup temperature in less than a minute.

References Cited by the Examiner

UNITED STATES PATENTS 2,968,622  1/1961  Whitehurst _____ 65—33 X
3,002,226  10/1961  Warthen _____ 65—29

FOREIGN PATENTS 774,339  5/1957  Great Britain.

DONALL H. SYLVESTER, *Primary Examiner.*

ROBERT L. LINDSAY, *Assistant Examiner.*